(12) United States Patent
Arai et al.

(10) Patent No.: US 7,795,524 B2
(45) Date of Patent: Sep. 14, 2010

(54) MUSICAL PERFORMANCE PROCESSING APPARATUS AND STORAGE MEDIUM THEREFOR

(75) Inventors: Miki Arai, Shizuoka-ken (JP); Satoshi Usa, Shizuoka-ken (JP); Takeshi Sakai, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 61 days.

(21) Appl. No.: 12/057,905

(22) Filed: Mar. 28, 2008

(65) Prior Publication Data
US 2009/0031884 A1 Feb. 5, 2009

(30) Foreign Application Priority Data
Mar. 30, 2007 (JP) ............................. 2007-090447
Mar. 6, 2008 (JP) ............................. 2008-055769

(51) Int. Cl.
G10H 7/00 (2006.01)
(52) U.S. Cl. .......................................... 84/612; 84/636
(58) Field of Classification Search ........... 84/600–602, 84/612, 636, 652, 658
See application file for complete search history.

(56) References Cited

U.S. PATENT DOCUMENTS

| | | | | |
|---|---|---|---|---|
| 4,972,753 | A * | 11/1990 | Adachi et al. ................. | 84/626 |
| 5,009,145 | A * | 4/1991 | Ishida et al. .................. | 84/612 |
| 5,382,750 | A | 1/1995 | Masahiko et al. | |
| 5,469,772 | A * | 11/1995 | Vandervoort .................. | 84/436 |
| 5,585,585 | A | 12/1996 | Paulson et al. | |
| 5,792,972 | A * | 8/1998 | Houston ....................... | 84/645 |
| 6,166,314 | A | 12/2000 | Weinstock et al. | |
| 6,750,390 | B2 * | 6/2004 | Ueta et al. .................... | 84/636 |
| 7,335,833 | B2 * | 2/2008 | Smith et al. .................. | 84/601 |
| 7,396,989 | B2 * | 7/2008 | Kikumoto ..................... | 84/604 |
| 7,423,214 | B2 * | 9/2008 | Reynolds et al. ............. | 84/612 |

(Continued)

FOREIGN PATENT DOCUMENTS

JP 2007-093820 4/2007

(Continued)

OTHER PUBLICATIONS

Clavinova CVP-309/307/305/303 Quick Guide, pp. 19-22, Yamaha Corporation, Internet, URL:http://www2.yamaha.co.jp/manual/pdf/emi/japan/cla/cvp309j2.PDF.

(Continued)

*Primary Examiner*—David S. Warren
(74) *Attorney, Agent, or Firm*—Harness, Dickey & Pierce, PLC (57) ABSTRACT

A musical performance processing apparatus that provides better assistance for student's practice. The apparatus includes a main unit in which music data including performance information of right- and left hand parts is stored, and a performance terminal having a keyboard divided into two key ranges by a split point. Each key range is set as a tapping or normal performance key range. The main unit generates a musical tone when input with performance information generated by depression of a key in the normal performance key range, and automatically reproduces performance information of designated part of music data for the number of beats corresponding to key depression, when input with performance information generated by depression of a key in the tapping performance key range. Sounding is stopped, if there is a deviation between a tempo of teacher's tapping performance and timing of student's performance.

7 Claims, 8 Drawing Sheets

U.S. PATENT DOCUMENTS

| | | | |
|---|---|---|---|
| 7,579,546 B2 * | 8/2009 | Sumita | 84/611 |
| 2001/0007221 A1 | 7/2001 | Uehara | |
| 2003/0004701 A1 * | 1/2003 | Ueta et al. | 704/1 |
| 2004/0112202 A1 * | 6/2004 | Smith et al. | 84/609 |
| 2005/0081700 A1 * | 4/2005 | Kikumoto | 84/604 |
| 2006/0243120 A1 * | 11/2006 | Takai et al. | 84/612 |
| 2008/0216636 A1 * | 9/2008 | Okamoto et al. | 84/604 |
| 2009/0049980 A1 * | 2/2009 | Sharma | 84/719 |

FOREIGN PATENT DOCUMENTS

| | | |
|---|---|---|
| JP | 2007-093821 | 4/2007 |
| WO | 02/084640 | 10/2002 |

OTHER PUBLICATIONS

Clavinova CLP-240/230 Owner's Manual, pp. 26-27, Yamaha Corporation, Internet, <URL:http://www2.yamaha.co.jp/manual/pdf/emi/japan/cla/clp240-ja-om.PDF>.

Clavinova CVP-305/303 Owner's Manual, p. 99, Yamaha Corporation, Internet, <URL:http://www2.yamaha.co.jp/manual/pdf/emi/japan/cla/cvp305j1.PDF>.

* cited by examiner

- ■ TAPPING DUET MODE
- ■ TEACHING MODE
  - • RIGHT-HAND PART PRACTICE
  - • LEFT-HAND PART PRACTICE
- ■ MULTI-PART MODE
- ■ FOOT TAPPING MODE
- ■ UPPER/LOWER KEYBOARD SPLIT MODE (ELECTONE)

MUSICAL PERFORMANCE PROCESSING APPARATUS AND STORAGE MEDIUM THEREFOR

BACKGROUND OF THE INVENTION

1. Field of the Invention

The present invention relates to a musical performance processing apparatus for controlling musical tone generation based on performance information, and a storage medium in which a musical performance processing program is stored.

2. Description of the Related Art

Heretofore, in an electronic piano or other electronic keyboard musical instrument, various functions have been provided that are useful for practice of musical performance.

For example, a function for use with music data including two tracks respectively stored with right- and left-hand parts is known that enables a user to select whether each part should be played by himself/herself or automatically played by an electronic piano ("Clavinova CVP-309/307/305/303 Quick Guide", PP. 19-22, Yamaha Corporation, [searched on Mar. 9, 2007], Internet <URL: http://www2.yamaha.co.jp/manual/pdf/emi/japan/cla/cvp309j2.PDF>). With this function, the user is able to select the right- or left-hand part and practice the selected part.

Also known is a function for use with a keyboard divided into left and right key ranges by a split point, the function being for automatically playing a chord whose fundamental tone is specified by depression of a key in a lower pitch key range on the left side with respect to the split point and for enabling a performer to play a desired phrase with keys in a higher pitch key range on the right side with respect to the split point ("Clavinova CLP-240/230 Owner's Manual", PP. 26-27, Yamaha Corporation, [searched on Mar. 9, 2007], Internet <URL:http://www2.yamaha.co.jp/manual/pdf/emi/japan/cla/clp240_ja_om.PDF>).

There is also known a so-called any-key function or follow lights function, which is for temporarily stopping the reproduction of music data upon arrival of timing in which a keyboard is to be played and for proceeding with music data reproduction when any of keys or a designated key is played ("Clavinova CVP-305/303 Owner's Manual", P. 99, Yamaha Corporation, [searched on Mar. 9, 2007], Internet <URL: http://www2.yamaha.co.jp/manual/pdf/emi/japan/cla/cvp305j1.PDF>). With this function, a user is able to play music data by repeatedly depressing a key in exact timing, and therefore, is able to practice hitting the keyboard in proper timing or hitting a correct key of the keyboard. With the aid of this function, the user can practice the right-hand part while causing the left-hand part to be automatically played, or vice versa. Of course, the user can simultaneously practice both the right- and left-hand parts using this function.

The applicant or assignee of this application has proposed a system that enables a user to control the reproduction of stored music data by simply depressing (tapping) an arbitrary key at a constant rhythm (Japanese Laid-open Patent Publications Nos. 2007-93820 and 2007-93821).

In the case of using an ordinary piano, a teacher must be capable of playing the piano to perform piano accompaniment for student's practice. When a student practices the left- or right-hand part separately on an ordinary piano, another part is not played or must be played by a teacher capable of playing piano. Thus, a person not capable of playing piano is difficult to perform piano accompaniment in duet for student's practice, and a student is difficult to practice the left- or right-hand part separately.

According to the above described prior art, when a student separately practices the left- or right-hand part on an electronic piano having an automatic performance function, another part is simply automatically reproduced. Thus, the student must perform the practice in time with the mechanical automatic reproduction. In addition, even if the student breaks down, becomes slow, or makes a mistake in the midst of his/her practice, the automatic reproduction goes ahead without waiting for user's performance, which can hinder good practice.

The follow lights function and the any-key function are intended for self-learning use and hence not suitable for teaching assistance use. Unless a musical performance is played exactly in tempo set beforehand, the musical performance is not regarded as accurate, and therefore, the resultant musical performance becomes monotonous, which hinders the performer to develop his/her expressive power. If the musical performance is not played in correct timing, the reproduction of music data is temporarily stopped, which poses a problem that the performer is difficult to grasp the tempo of playing the music.

In sometime cases, the teacher gives lesson while singing a phrase which the student should play. If the reproduction of music data is temporarily stopped during the lesson, the teacher is difficult to proceed with the lesson while singing, which poses a problem.

SUMMARY OF THE INVENTION

The present invention provides a musical performance processing apparatus capable of providing better assistance for student's practice, and a storage medium storing a musical performance processing program.

According to a first aspect of this invention, there is provided a musical performance processing apparatus comprising a storage unit adapted to store music data including a plurality of performance parts, a performance control unit adapted, when input with performance information, to generate a musical tone corresponding to the performance information input thereto, a performance reproduction control unit adapted, when input with performance information, to reproduce a performance part designated from among the plurality of performance parts in tempo determined based on the performance information input thereto, and a performance information processing unit adapted, when input with performance information which is output from at least one performance terminal in response to a performer's operation thereon, to output the input performance information to the performance control unit or the performance reproduction control unit in accordance with a type of the input performance information.

The performance terminal can include an electronic keyboard musical instrument having at least one key range each comprised of a plurality of keys, and the performance information processing unit can be adapted to output the performance information associated with a part of the key range in the electronic keyboard musical instrument to the performance control unit, and output the performance information associated with another part of the key range to the performance reproduction control unit.

When a difference greater than a predetermined value is present between the input performance information and performance data included in the music data in association with the designated performance part, the performance control unit can be adapted not to generate a musical tone corresponding to the input performance information.

The musical performance processing apparatus can include a setting unit adapted to set a teaching mode to be on or off, and the performance information processing unit can be adapted to output the performance information, which is output in response to the performer's operation, to the performance control unit irrespective of the type of the performance information when the teaching mode is off.

According to a second aspect of this invention, there is provided a storage medium computer-readably storing a program for causing a computer to execute a musical performance processing method in a musical performance processing apparatus having a storage unit in which music data including a plurality of performance parts is stored, the musical performance processing method comprising a performance control step of, when input with performance information, generating a musical tone corresponding to the input performance information, a performance reproduction control step of, when input with performance information, reproducing a performance part designated from among the plurality of performance parts in tempo determined based on the input performance information, and a performance information processing step of, when input with performance information which is output from at least one performance terminal in response to a performer's operation thereon, outputting the input performance information to the performance control step or the performance reproduction control step in accordance with a type of the input performance information.

When a difference greater than a predetermined value is present between the input performance information and performance data included in the music data in association with the designated performance part, a musical tone corresponding to the input performance information may not be generated in the performance control step.

In the performance information processing step, the performance information output in response to the performer's operation can be output to the performance control step irrespective of the type of the performance information when a teaching mode is set to be off by a setting unit of the musical performance processing apparatus for setting the teaching mode to be on or off.

According to a musical performance processing apparatus of this invention and a storage medium of this invention stored with a musical performance processing program, both a tapping performance function and a keyboard split function can be achieved, and therefore, even a person not capable of playing a keyboard is able to play an accompaniment for student's practice or the like by performing a tapping performance.

In a case that a performer practices playing the right- or left-hand part separately by himself/herself, the performer is able to play one of these parts as usual, while performance of another part is controlled by simple tapping. Thus, the performer can make practice in a tempo suitable to the degree of his/her progress, and can play the practice with desired musical expression.

In a case that the performer plays a performance with the aid of teaching assistance, if the performer's performance is inaccurate in timing, his/her performance is not sounded, and therefore, the performer can easily understand whether or not he/she is playing the performance in correct timing and note.

In the case that a setting unit for setting a teaching mode to be on or off is provided, the performer can utilize a teaching assistance function as desired.

Further features of the present invention will become apparent from the following description of exemplary embodiments with reference to the attached drawings.

BRIEF DESCRIPTION OF THE DRAWINGS

FIGS. 6A to 6C are views for explaining operation of the second embodiment, wherein FIG. 6A schematically shows teacher's tapping performance, FIG. 6B schematically shows a phrase of MIDI data associated with a part to be played by a student, and FIG. 6C shows a reception timing of key depression data generated by a student's musical performance;

DETAILED DESCRIPTION OF THE PREFERRED EMBODIMENTS

The present invention will now be described in detail below with reference to the drawings showing preferred embodiments thereof.

Figure 1:
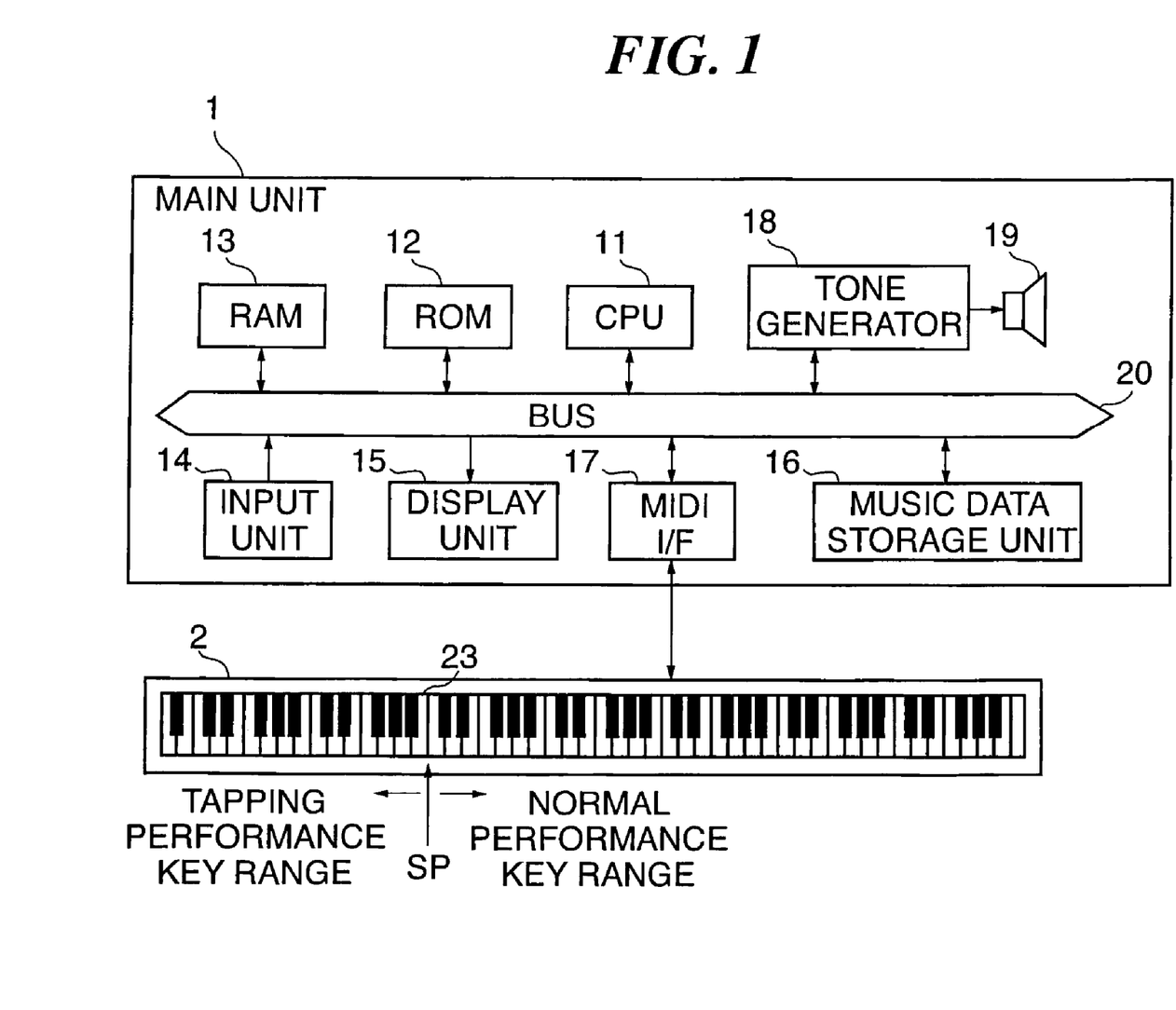
FIG. 1 is a block diagram showing the construction of a musical performance processing apparatus according to a first embodiment of this invention.

FIG. 1 is a block diagram showing the construction of a musical performance processing apparatus according to a first embodiment of this invention.

The musical performance processing apparatus of this embodiment is comprised of a main unit 1 and at least one performance terminal 2, which is an electronic keyboard musical instrument connected to the main unit 1.

As shown in FIG. 1, the main unit 1 comprises a control unit (CPU) 11 for controlling the overall main unit 1, a ROM 12 for storing various control programs, data, etc., a RAM 13 used as a work memory or the like, an input unit 14 such as input switches, a display unit 15, a music data storage unit 16 such as an HDD for storing pieces of music data, a MIDI interface circuit 17 connected to the performance terminal 2, a tone generator 18, a speaker 19, and a bus 20 to which the aforementioned structural elements are connected. The main unit 1 can be implemented by a personal computer, for instance.

Music data stored in the music data storage unit 16 is MIDI data such as, for example, SMF (Standard MIDI File), and includes performance data for a plurality of performance parts (for example, right-hand part played by the right hand and the left-hand part played by the left hand, or performance parts for different types of musical instruments, or performance part for the principal tune and performance part for rhythm tune, or the like), the performance data for performance parts being stored in different tracks. The performance data (sequence data) includes combinations of time information (delta time) indicating a time interval between events and event information (MIDI event), the combinations being arranged in the order of event generation.

Figure 2:
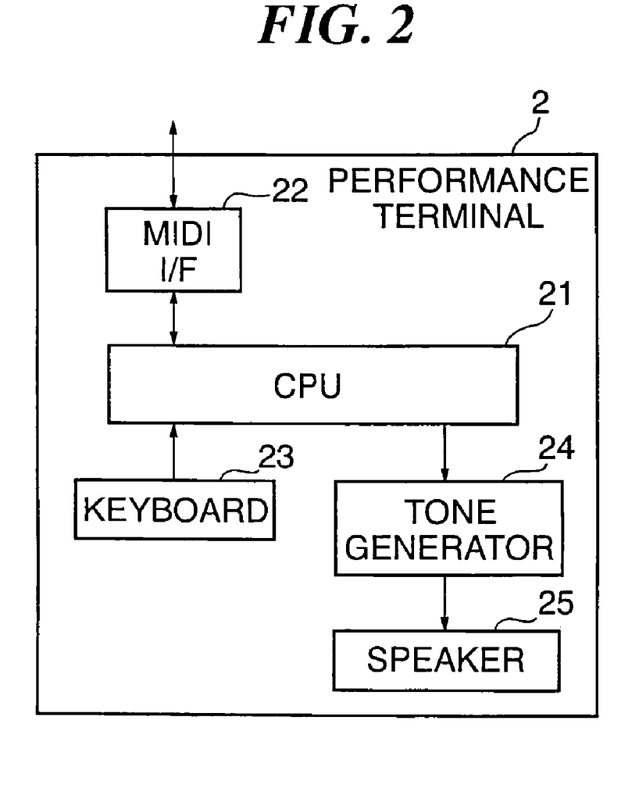
FIG. 2 is a block diagram showing an example of the construction of a performance terminal shown in FIG. 1.

FIG. 2 is a block diagram showing the internal construction of the performance terminal 2, which is an electronic piano or other MIDI-compatible electronic keyboard musical instrument.

As shown in FIG. 2, the performance terminal 2 includes a control unit (CPU) 21 that centrally controls the performance terminal 2, a MIDI interface circuit 22 connected to the MIDI interface circuit 17, a keyboard 23, a tone generator 24, and a speaker 25.

The keyboard 23 has, for example, 61 or 88 keys and can play in 5 to 7 octaves. Each key of the keyboard 23 includes a sensor for detecting key on/off and a sensor for detecting the intensity of key depression.

When the keyboard 23 is operated, the control unit 21 generates performance information corresponding to the operation on the keyboard 23 and sends the generated performance information to the main unit 1 via the MIDI interface circuit 22. When receiving tone generator control data from the main unit 1, the control unit 21 outputs the tone generator control data to the tone generator 24. The tone generator 24 generates a musical tone waveform corresponding to the tone generator control data, whereby a musical tone is emitted from the speaker 25. It should be noted that it is not inevitably necessary to mount the tone generator 24 and the speaker 25 on the performance terminal 2. Musical tones may be emitted using the tone generator 18 and the speaker 19 mounted on the main unit 1.

In this embodiment, as shown in FIG. 1, the keyboard 23 of the performance terminal 2 is divided into two regions (key ranges) by a split point SP, which can arbitrarily be set by a user. For each of the divided key ranges, either a tapping performance key range used for a tapping performance or a normal performance key range having keys for being depressed for generation of corresponding musical tones can arbitrarily be set.

The tapping performance is performed in a performance mode for which the number of times the performer should depress the keyboard in one bar (the number of beats) is set in advance and in which, when a performance operation such as depressing an arbitrary key is made by the performer, musical tones corresponding to performance data of a performance part assigned to the tapping performance are automatically reproduced for the preset number of beats in tempo corresponding to key depression timing and in dynamics (sound volume) corresponding to the intensity of key depression. For example, in a case where the number of beats is set to two for a music piece to be played at four-four time, musical tones for the first and second beats are generated upon the first key depression for one bar, and musical tones for the third and fourth beats are generated upon the next key depression. Thus, musical performance (reproduction of music data) can be carried out with a simple operation such as hitting the keyboard at a constant rhythm with a finger (i.e., tapping the keyboard).

Using the input unit 14 and the display unit 15 of the main unit 1 and the keyboard 23 of the performance terminal 2, the user is able to arbitrarily set the split point SP, able to set whether each of the key ranges divided by the split point SP should be assigned to the tapping performance key range or the normal performance key range, and able to set which part of the selected music piece should be reproduced in the tapping performance.

In a split point setting mode, the split point SP can be set by, for example, operating a desired key on the keyboard 23 to cause a note number (key number) of the key to be stored in a predetermined region in the RAM 13 of the main unit 1.

The setting to set which key range, among the key ranges divided by the split point SP, to the tapping performance key range and which key range to the normal performance key range can be carried out by causing the key ranges divided by the set split point SP to be displayed on the display unit 15 and by designating each displayed key range as the tapping performance key range or the normal performance key range using the input unit 14 or the like.

As shown by way of example in FIG. 1, the key range on the lower pitch side (left side) than the split point SP can be set to the tapping performance key range, and the key range on the higher pitch side (right side) than the split point SP can be set to the normal performance key range. Conversely, the lower pitch side key range can be set to the normal performance key range and the higher pitch side key range can be set to the tapping performance key range. Also, both the lower and higher pitch side key ranges can be set to the tapping performance key range or the normal performance key range.

Similarly, the setting of which part (for example, the left- or right-hand part) of the selected music data should be reproduced in the tapping performance can arbitrarily be made by causing names of parts, which are included in the music data of the music piece being played, to be displayed on the display unit 15, and by selecting a music data part to be reproduced in the tapping performance using the input unit 14 or the like. For example, in the example shown in FIG. 1, the assignment is such that the left-hand part of the music data will be reproduced in the tapping performance.

The following is a description of operation of the musical performance processing apparatus having the above construction.

Figure 3:
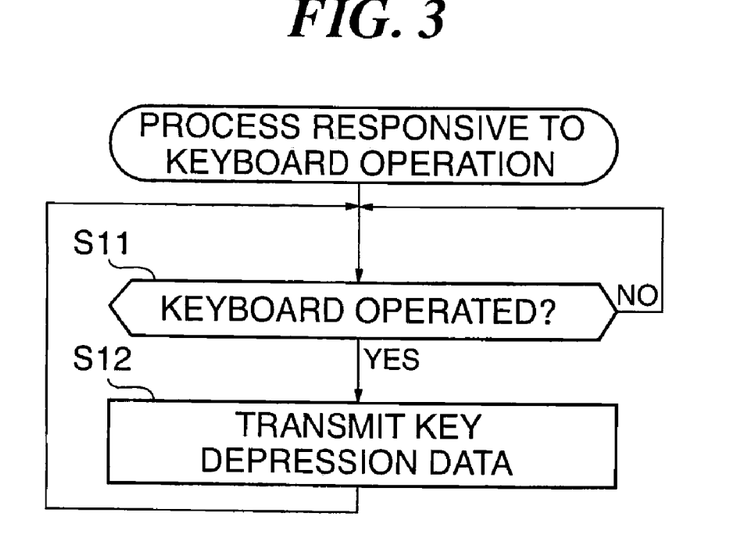
FIG. 3 is a flowchart showing a process flow executed upon a keyboard of the performance terminal being operated.

FIG. 3 is a flowchart showing the process flow executed upon the keyboard 23 of the performance terminal 2 being operated.

When a key of the keyboard 23 of the performance terminal 2 is depressed by the user with a finger (step S11), an operation signal is transmitted from the keyboard 23 to the control unit 21. Since a sensor for detecting key on/off and a sensor for detecting key depression intensity are incorporated in each key of the keyboard 23 as described above, the keyboard 23 outputs the operation signal to the control unit 21 according to the operation state of each key (e.g., which key is depressed in what timing at what intensity).

Based on the operation signal, the control unit 21 generates performance information (key depression data), and transmits it to the main unit 1 via the MIDI interface circuit 22 (step S12), whereupon the control unit 21 waits for the next keyboard operation. When the keyboard 23 is operated, the control unit 21 generates key depression data including a note number corresponding to a key number of the depressed key and velocity information indicating the intensity of key depression, and transmits the key depression data to the main unit 1.

As described above, the key depression data corresponding to the operation on the keyboard 23 is transmitted from the performance terminal 2 to the main unit 1.

Figure 4:
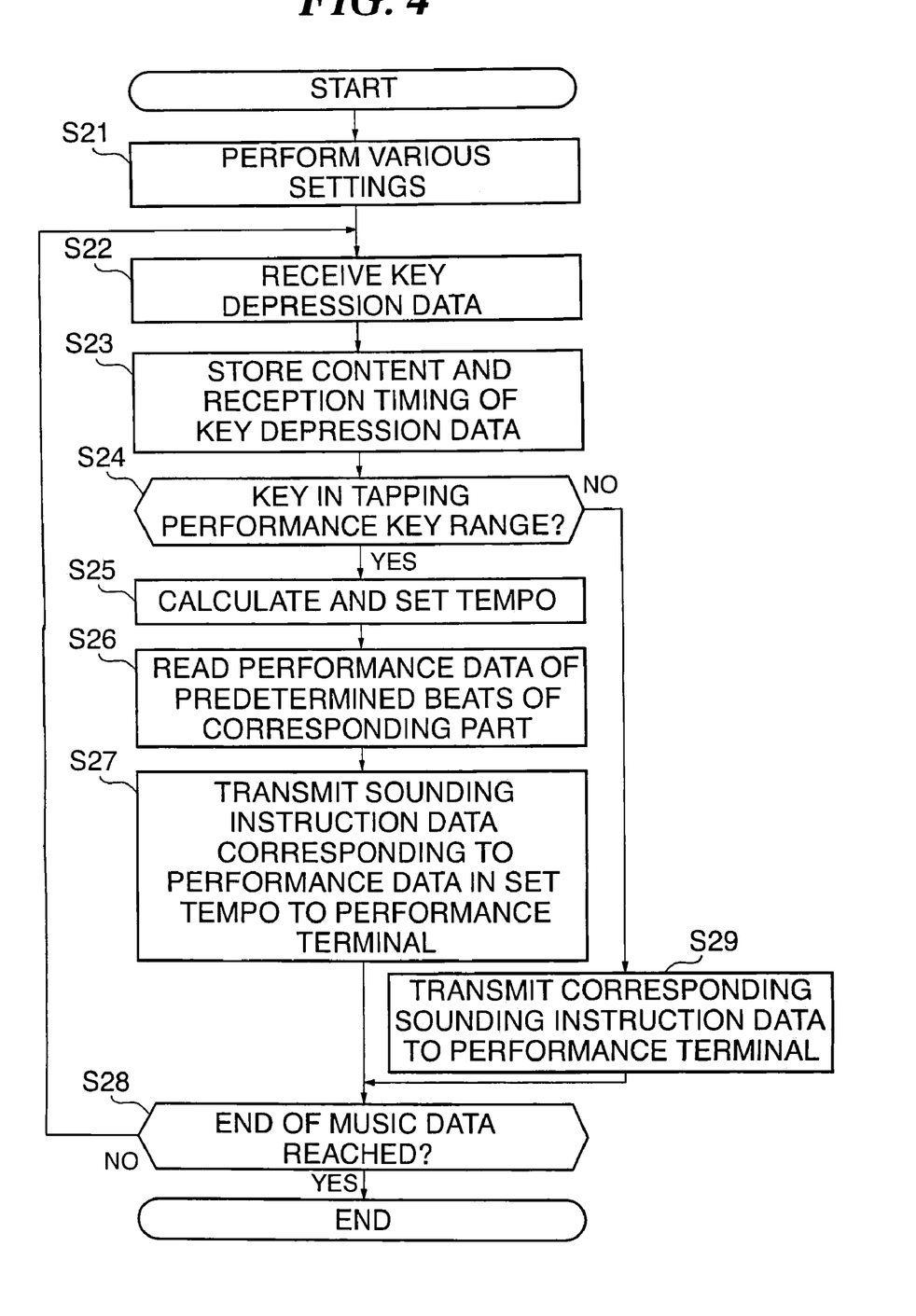
FIG. 4 is a flowchart showing a process flow in a main unit shown in FIG. 1.

FIG. 4 shows in flowchart the process flow in the main unit 1 of the first embodiment of this invention.

In the main unit 1, various setting processes are first carried out (S21).

The user carries out various settings such as selecting a piece of music to be played, setting the split point SP, setting as to whether the key ranges should each be set to the normal performance key range or the tapping performance key range, and setting as to which part of the music piece should be reproduced in tapping performance.

When the music piece to be played is selected by the user, information representing parts contained in music data is read out from the music data storage unit 16 to the RAM 13.

As described above, when a key on the keyboard 23 which the user wishes to set as the split point SP is operated, key depression data is transmitted to the main unit 1, and a note number contained in the key depression data is set as information representing the split point SP into a predetermined region of the RAM 13.

When a designation is made as to which of the tapping performance key range or the normal performance key range should be assigned to each of the key ranges divided by the split point SP, the resultant information is stored in a predetermined region of the RAM 13.

In a case where there is a key range assigned to the tapping performance key range, when a part to be played in the tapping performance is selected, performance data for the selected part of the selected music data is read out from the music data storage unit 16 to a predetermined region of the RAM 13.

It is assumed here that the split point SP is set as shown in FIG. 1, the key range on the lower pitch side than the split point SP is set as the tapping performance key range, the key range on the higher pitch side than the split point SP is set as the normal performance key range, and music data for the left-hand part is set to be reproduced in the tapping performance.

When key depression data is received from the performance terminal 2 (S22), the content (note number, velocity information) and reception timing (time) of the key depression data are stored in a predetermined region of the RAM 13 (S23).

Then, whether or not the received key depression data is associated with a key in the tapping performance key range is determined (S24). In this example, the determination can be carried out by comparing the note number contained in the received key depression data with the note number set for the split point SP.

When it is determined that the depressed key is in the tapping performance key range (located on the left side with respect to the split point SP in this example)(if YES to S24), a time period elapsed from reception of the preceding key depression data to reception of the current key depression data is calculated based on the information stored in the step S23. Then, based on the calculated elapse time period, a tempo of the tapping performance is calculated and set as tempo data (S25).

Next, among music data for the part assigned to the tapping performance (the left-hand part in this example), performance data for the beats to be sounded in response to the key depression is written into a predetermined buffer region of the RAM 13 (S26). For example, performance data for two beats is written if the number of beats is set to two in four-four time music, whereas performance data for one beat is written if the number of beats is set to four.

Then, sounding instruction data for sounding a musical tone that corresponds to the performance data for the beginning beat is generated and transmitted to the performance terminal 2. Further, pieces of sounding instruction data corresponding to respective ones of subsequent performance data to be sounded in association with the key depression are generated and sequentially transmitted to the performance terminal 2 in timing determined based on the tempo data set in the step S25 (S27). At that time, the velocity information contained in the sounding instruction data transmitted to the performance terminal 2 is changed according to velocity information contained in the key depression data, whereby musical tones can be generated with sound volume varying according to the intensity of tapping performance.

This sounding instruction data is received via the MIDI interface circuits 17 and 22 by the control unit 21 of the performance terminal 2, and then output from the control unit 21 to the tone generator 24 in which musical tones corresponding thereto are generated for emission from the speaker 25.

Next, whether or not the end of the music data to be reproduced is reached is determined (S28). If the end of the music data is not reached, the process returns to the step S22 for reception of the next key depression data.

If the depressed key is in the normal performance key range (located on the right side with respect to the split point SP in this example)(if N0 to S24), sounding instruction data corresponding to the key depression data is transmitted to the performance terminal 2 (S29). As a result, a musical tone corresponding to the depressed key is generated by the tone generator 24 of the performance terminal 2 and emitted from the speaker 25.

As described above, in this embodiment, musical tones are generated in accordance with keys in the normal performance key range being depressed and released, whereby the operation of a normal electronic musical instrument is achieved. On the other hand, upon each key depression in the tapping performance key range, performance data for the assigned part of a length corresponding to the preset number of beats can be reproduced in a tempo corresponding to key depression timing with dynamics (sound volume) varying according to the intensity of key depression.

In this embodiment, the tone generator (18 or 24) and the speaker (19 or 25) are mounted on each of the main unit 1 and the performance terminal 2. Alternatively, a tone generator and a speaker can be mounted on either one of the main unit and the performance terminal, and musical tones can be generated using the tone generator and the speaker mounted on the main unit 1 or the performance terminal 2.

For example, in a case where a MIDI keyboard not provided with a tone generator and a speaker is used as the performance terminal, there can be used the tone generator 18 and the speaker 19 mounted on the main unit 1, or an external tone generator and an external speaker that are connected to the main unit 1.

In the above, the embodiment has been described that includes the main unit 1 which is comprised of a personal computer and to which the performance terminal 2 comprised of an electronic keyboard musical instrument such as an electronic piano is connected. Alternatively, the above described functions of the main unit 1 can be realized by the performance terminal 2 comprised of an electronic piano or other electronic keyboard musical instrument. In that case, a musical performance processing apparatus of this invention can be realized in the form of a single electronic keyboard musical instrument. Specifically, the performance terminal 2 can have a music data storage unit 16, a display unit 15, an input unit 14, etc. mounted thereon, and the functions of the control unit 11 of the main unit 1 can be realized by the control unit 21 of the performance terminal 2.

Next, a description will be given of a second embodiment of this invention. In this embodiment, a timing in which a phrase is to be played by a student in the normal performance (target timing) is calculated based on, for example, a timing of beats in the tapping performance performed by a teacher. If an actual timing of student's performance is deviated from the calculated target timing, or if there is a difference in sort (tone pitch) even when the actual timing matches the target timing, a phrase concerned is made not to be sounded.

Figure 5:
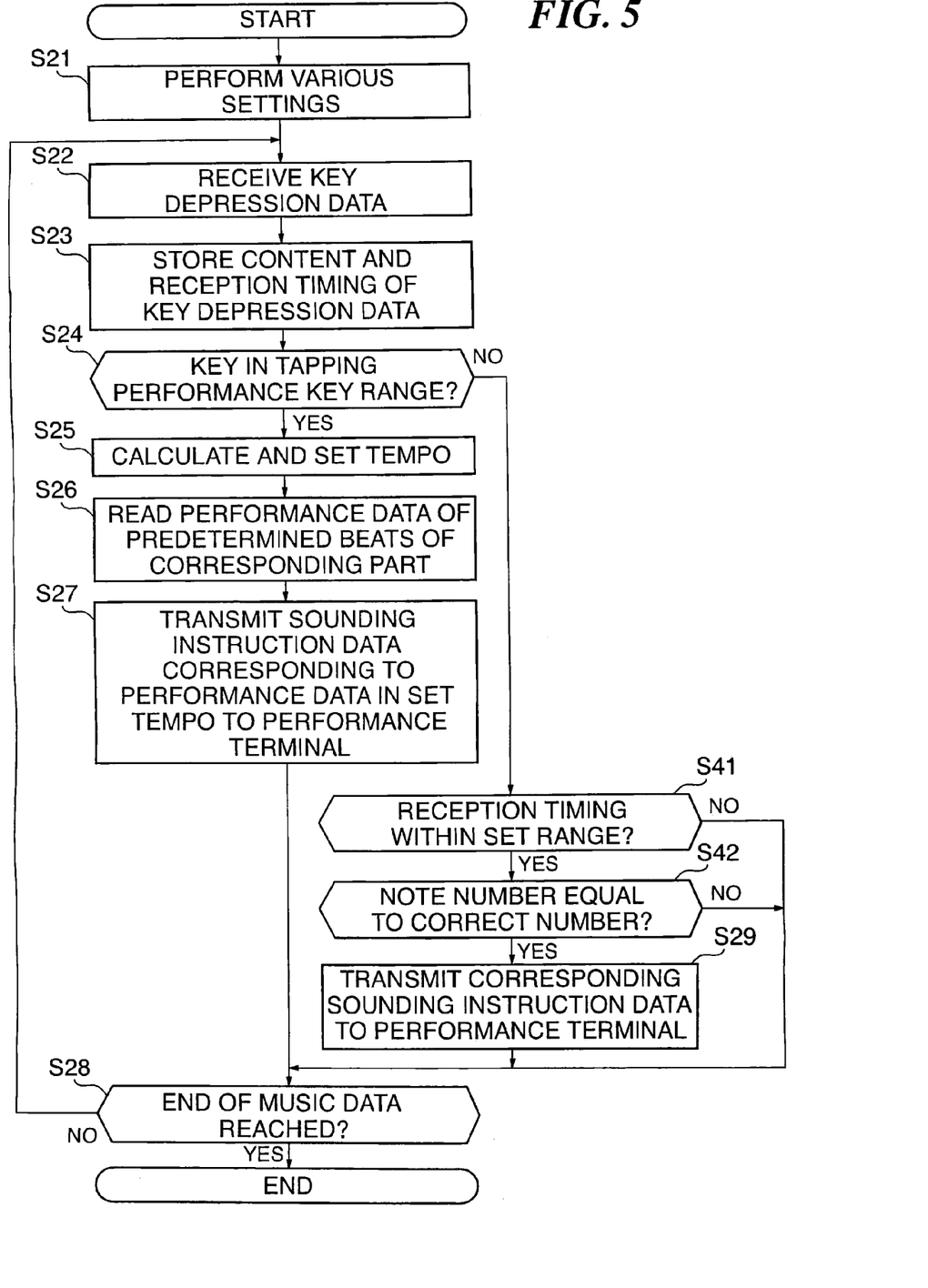
FIG. 5 is a flowchart showing a process flow in a main unit according to a second embodiment of this invention.

FIG. 5 shows in flowchart the process flow performed by the main unit 1 according to the second embodiment of this invention.

As seen from comparison between FIGS. 4 and 5, this embodiment (FIG. 5) differs from the first embodiment (FIG. 4) in that steps S41 and S42 are provided before step S29. When key depression data generated upon key depression on the normal performance key range is received, whether or not a reception timing of the key depression data falls within a set range of performance timing is determined at the step S41. In the step S42, whether or not a note number of the key depression data is equal to a correct number is determined. Only when results of the determinations in the steps S41 and S42 are both YES, sounding instruction data corresponding to the received key depression data is transmitted to the performance terminal (step S29), whereby a corresponding musical tone is generated.

Specifically, as described above, a tempo of tapping performance is calculated in the step S25 based on a time period elapsed from reception of key depression data generated upon key depression on the tapping performance key range to reception of the next key depression data, and the calculated value is set as tempo data. In the step S41, note-on timing in performance data (MIDI data) for the part assigned to the normal performance key range is calculated based on the tempo data. Further, a deviation between the calculated note-on timing and the reception timing (stored in the step S23) of the key depression data associated with the normal performance key range is determined, and whether or not an amount of the deviation falls within a set range is determined. When the amount of the deviation of the reception timing of the key depression data falls outside the set range, the process returns to step S22 via step S28 without sounding instruction data corresponding to the received key depression data being transmitted to the performance terminal 2. When the amount of the deviation falls within the set range, the process proceeds to the step S42 in which whether or not the note number of the received key depression data is equal to the note number of performance data of the part assigned to the normal performance key range is determined. If these note numbers are not equal to each other, the process returns to the step S22 without sounding instruction data corresponding to the received key depression data being transmitted to the performance terminal 2. If the two note numbers are equal to each other, sounding instruction data corresponding to the receive key depression data is transmitted to the performance terminal 2 (S29), whereby a corresponding musical tone is generated.

Figure 6A:
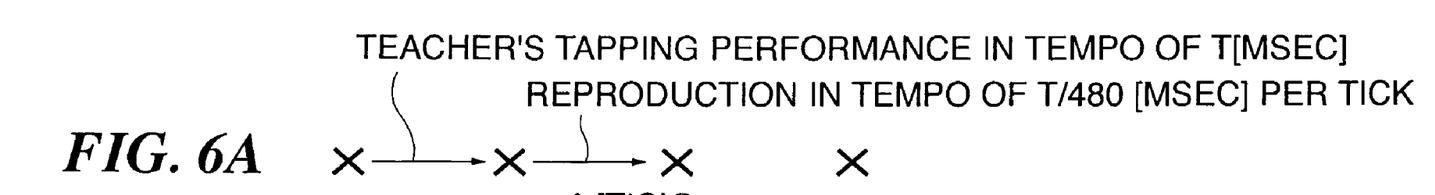
Figure 6B:
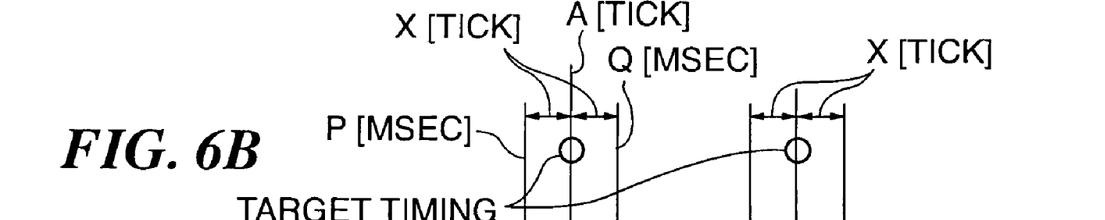
Figure 6C:
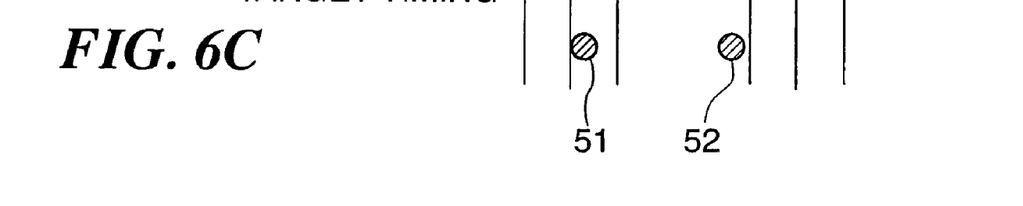

With reference to FIGS. 6A to 6C, the operation of this embodiment will further be described.

In this embodiment, from MIDI data of a music piece, a track or a channel containing MIDI data associated with the part to be played by the student is extracted for use in evaluation of student's performance timing (more specifically, student's key depression timing). On the other hand, the remaining data is used for musical tone reproduction performed in time with the teacher's tapping performance. It is assumed here that resolution is equal to 480 ticks per beat (quarter note).

It is further assumed that the tapping performance is carried out by the teacher in a tempo of T [msec] per beat as shown in FIG. 6A. At that time, the control unit 11 reproduces the tapping performance part of the music data in a tempo of T/480 [msec] per one tick.

In order to determine a deviation of the student's performance timing from the target timing, tick values indicative of performance timings (target timings) are acquired from phrases of MIDI data associated with the part to be played by the student. FIG. 6B shows one of the performance timings acquired from a phrase of the MIDI data associated with the part to be played by the student and assigned to the normal performance key range. This target timing is represented by a tick value of A [tick].

To define an allowable range of deviation of the student's performance timing from the target timing, an allowable error of X tick is set before and after the target timing A [tick], for example. In that case, a window having a width of 2X [tick] is provided at the target timing A [tick], and it is determined whether or not key depression data associated with student's performance is received at a timing falling within the window. To this end, based on the tempo of the teacher's tapping performance (1 [tick]=T/480 [msec] where T [msec] represents the tempo per beat), a timer-measured value corresponding to the range of A plus or minus X [tick] is calculated, which varies from P [msec] to Q [msec].

FIG. 6C shows reception timings of key depression data associated with student's performance. When the key depression data is received in a timing indicated at 51 in FIG. 6C, the reception timing falls within the range from P [msec] to Q [msec], and therefore, the result of determination in the step S41 becomes YES. On the other hand, when the key depression data is received in a timing indicated at 52, the reception timing falls outside the range from P [msec] to Q [msec], and therefore, the result of determination in the step S41 becomes NO.

As described above, whether or not the student's performance timing matches the target timing calculated based on the tempo of the teacher's tapping performance is determined.

It should be noted that the degree of difficulty in playing the music can be adjusted by changing the magnitude of X [tick] that determines the allowable range.

According to this embodiment, as described above, the student is able to grasp in real time whether or not he/she makes a mistake in playing the music, without being stopped to play the music. Thus, the student can quickly learn the rhythm of a phrase. Since the reproduction of musical tone is not temporarily stopped, the teacher is able to teach while singing.

Next, a description will be given of a performance processing apparatus according to a third embodiment of this invention.

In this embodiment, a unit for setting on/off of a teaching mode is provided in an input unit, whereby on/off of the teaching mode can be changed using the setting unit. As a result, a teaching assistance function of this invention can easily be utilized as desired.

In the following, an explanation is given of the musical performance processing apparatus of this embodiment for a case where the apparatus is applied, for example, to an electronic keyboard musical instrument.

Figure 7:
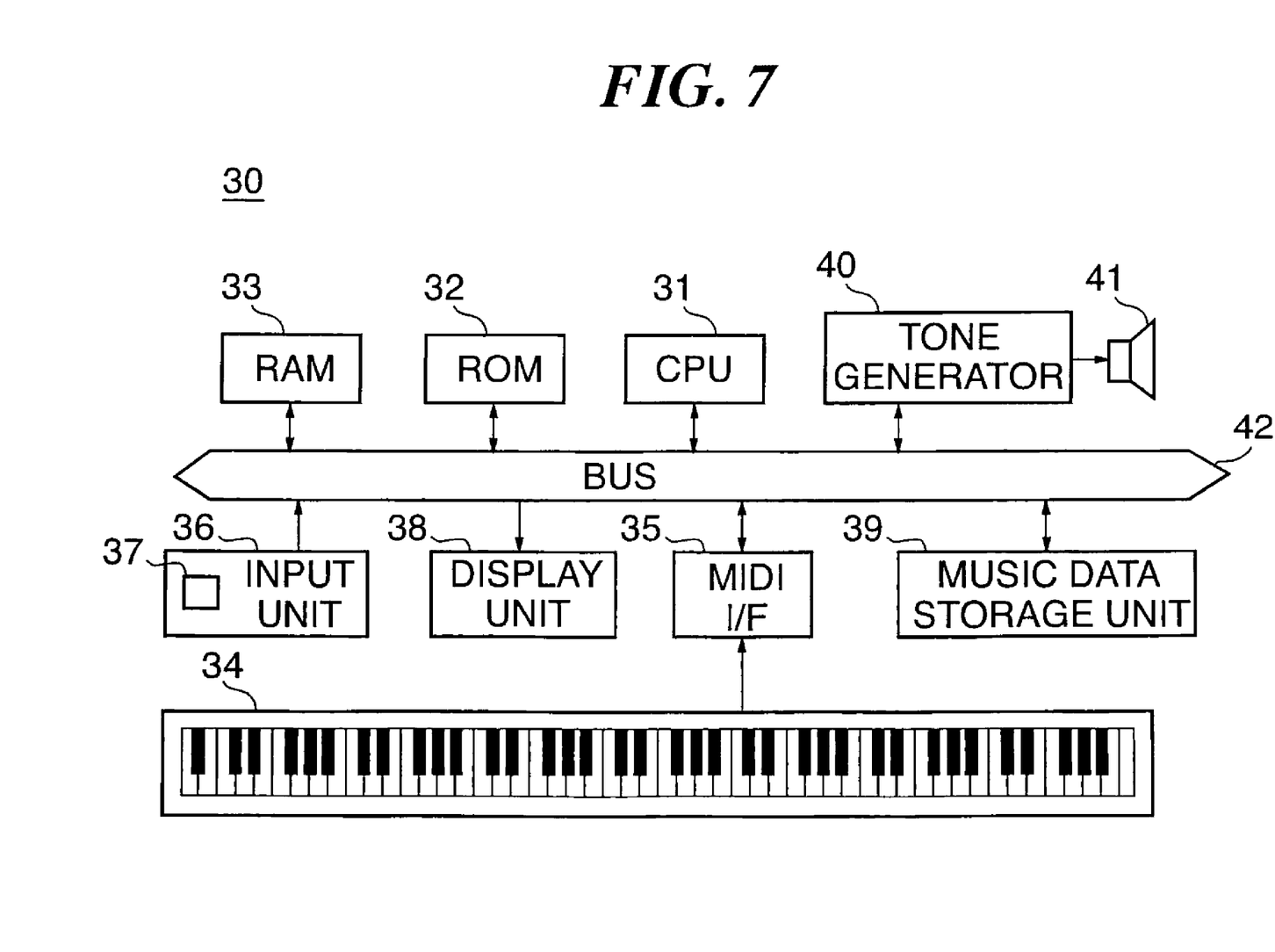
FIG. 7 is a block diagram showing the construction of an electronic keyboard musical instrument, which is a musical performance processing apparatus according to a third embodiment of this invention.

FIG. 7 shows in a block diagram an electronic keyboard musical instrument 30, which is a musical performance processing apparatus according to the third embodiment of this invention. As shown in FIG. 7, the electronic keyboard musical instrument 30 includes a control unit (CPU) 31 for controlling the entire musical instrument 30, a ROM 32 for storing various control programs, data, etc., a RAM 33 used as a work memory or the like, a keyboard 34, a MIDI interface circuit 35 for inputting a MIDI message output from the keyboard 34, an input unit 36 having various operation buttons, a display unit 38, a music data storage unit 39 for storing music data, a tone generator 40, a speaker 41, and a bus 42 through which the aforementioned elements are connected to one another.

The input unit 36 is provided with a teaching mode button 37, which is a setting unit for setting the on/off of the teaching mode in the electronic keyboard musical instrument 30. It should be noted that the setting unit may not be a push button switch, but may be any means that can input an instruction to turn on/off the teaching mode.

As with the keyboard 23 in the first embodiment shown in FIGS. 1 and 2, a sensor for detecting key on/off and a sensor for detecting the intensity of key depression are incorporated in each key of the keyboard 34, and key depression data varying according to key depression is output to the MIDI interface circuit 35.

As with the above described embodiments, the music data storage unit 39 stores music data (MIDI data) in which pieces of performance data for a plurality of performance parts are stored in different tracks or channels.

Figure 8A:
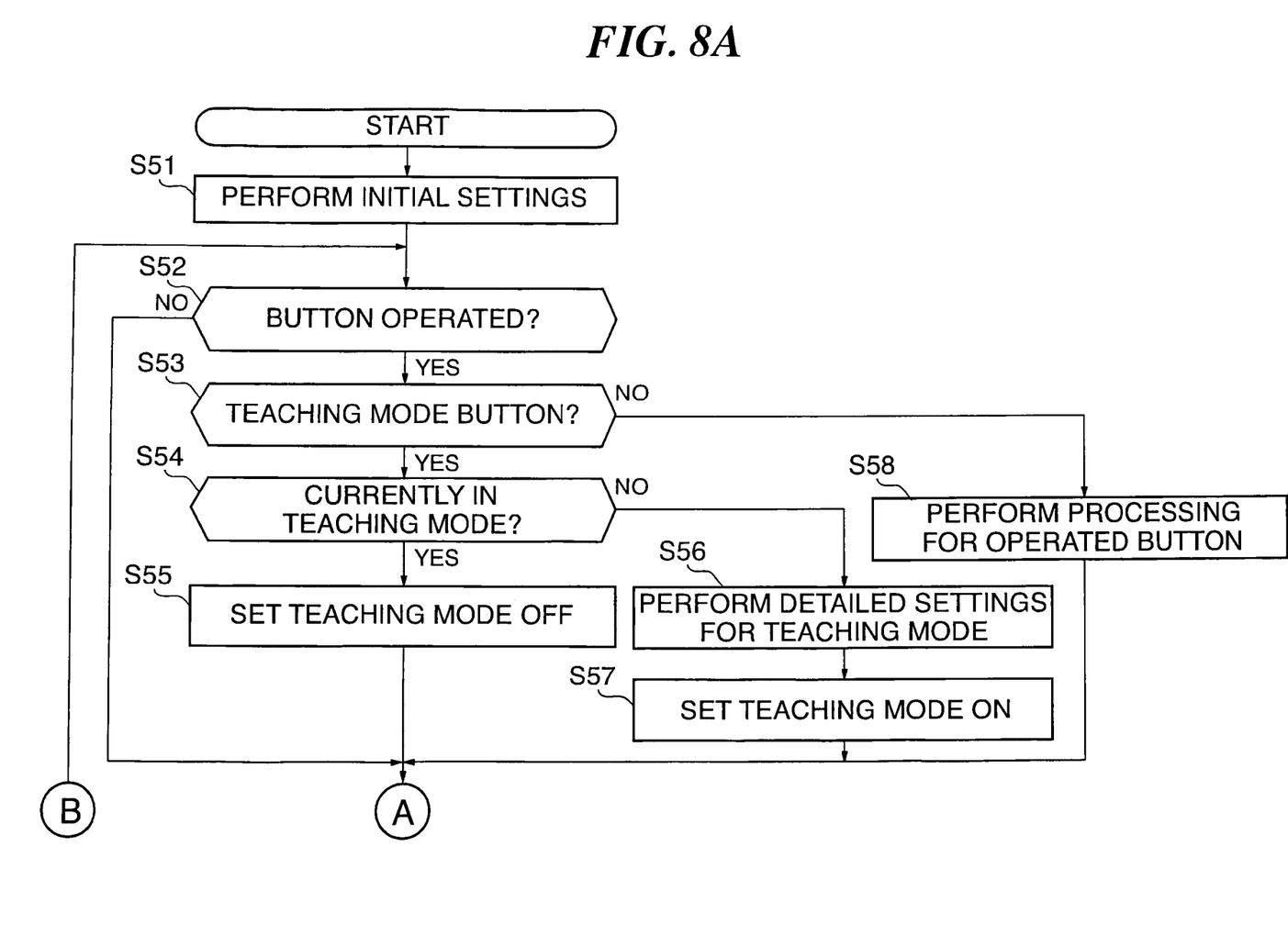
FIGS. 8A and 8B are a flowchart showing a process flow in the musical performance processing apparatus of the third embodiment.
Figure 8B:
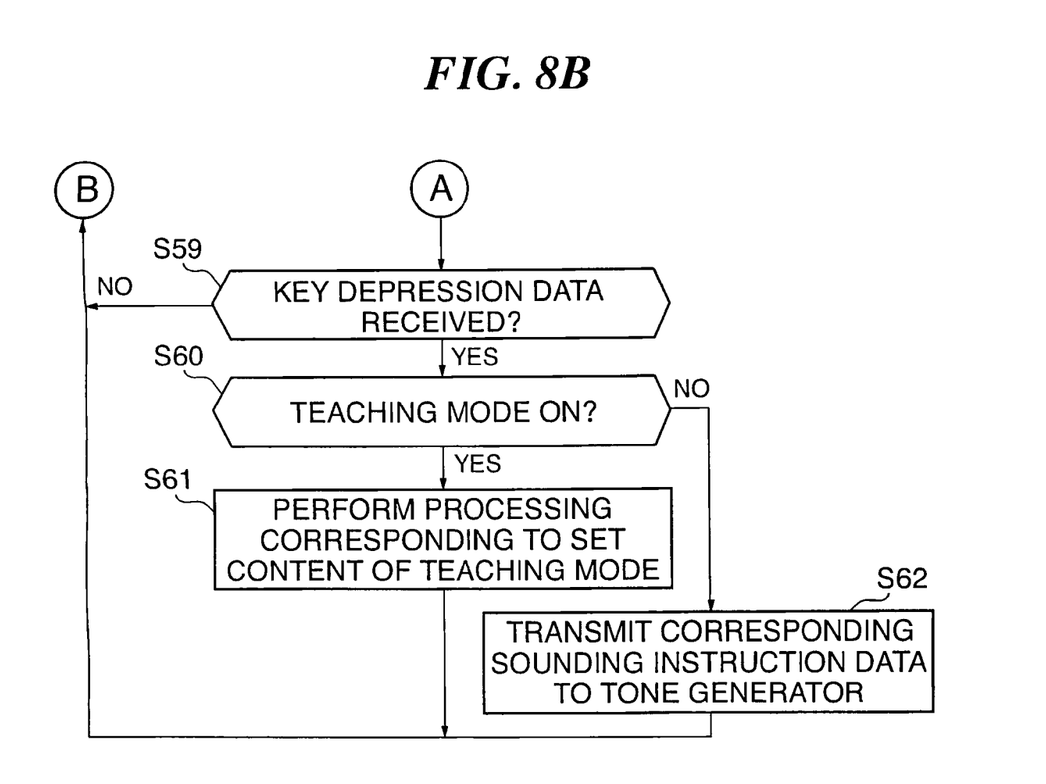

FIGS. 8A and 8B show in flowchart the process flow in the musical performance processing apparatus according to the third embodiment of this invention.

Upon start of operation of the electronic keyboard musical instrument 30, various initial settings are carried out (S51), and whether or not any of various operation buttons and switches in the input unit 36 is operated is detected (S52).

When no operation is detected, the process proceeds to step S59. When any of the operation buttons and switches is operated, whether or not the teaching mode button 37 is operated is determined (S53). If an operation button or switch other than the teaching mode button 37 is operated, processing for the operated button or switch is carried out (S58), whereupon the process proceeds to step S59.

When the teaching mode button 37 is operated, whether or not the current operation mode is the teaching mode is determined (S54). If the current operation mode is the teaching mode, the teaching mode is set to be off (free performance mode)(S55), whereupon the process proceeds to step S59.

On the other hand, when the current operation mode is other than the teaching mode (when the teaching mode is off), detailed settings for the teaching mode are carried out in step S56, and the teaching mode is set to be on in step S57, whereupon the process proceeds to step S59.

Figure 9:
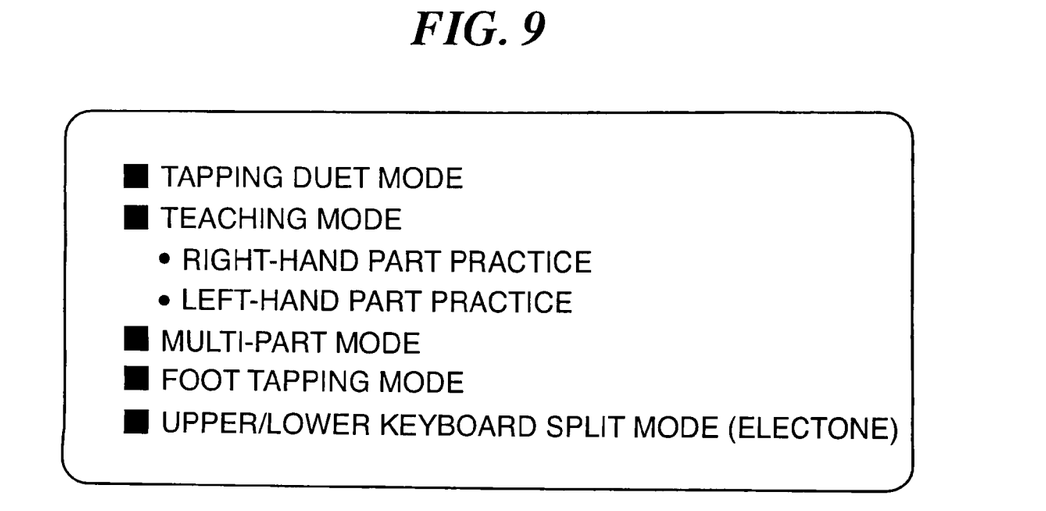
FIG. 9 is a view showing an example of a screen displayed on a display unit and used for detailed settings for a teaching mode.

FIG. 9 shows an example of a screen displayed on the display unit 38 for the detailed settings for the teaching mode (S56).

As shown in FIG. 9, various teaching assistance functions that can be achieved by the electronic keyboard musical instrument 30 are displayed on the screen for the detailed settings for the teaching mode. The user selects a desired teaching assistance function using an operation button of the input unit 36 or the like.

In the example shown in FIG. 9, various teaching assistance functions are displayed, including: (1) a tapping duet mode (in which both the right- and left-hand parts are played in the tapping performance); (2) a teaching mode for right- or left-hand practice (in which the right- or left-hand part is played in the free performance, and only the left- or right-hand part is played in the tapping performance); (3) a multi-part mode (in which a music piece, such as an orchestra music piece, comprised of a plurality of musical instrument parts is divided into a designated part and the remaining part, and the designated part and the remaining part are respectively played in the right and left key ranges, or vice versa); (4) a foot tapping mode (in which the tapping performance is played by a foot keyboard, and the free performance is performed by both hands); and (5) an upper/lower keyboard split mode (in which the tapping performance and the free performance are respectively performed by upper and lower keyboards or vice versa in the case of an electone (registered trademark)).

Among the displayed teaching assistance functions, the user selects a teaching assistance function which the user wishes to use. When any teaching assistance function is selected, a screen for use in making detailed settings for the selected function is displayed, and the user inputs information of required items on the screen.

Specifically, when selecting the tapping duet mode, the user carries out selection of a music piece to be played, setting of the split point (SP), assignment of performance parts, setting of the number of beats (the number of times of key depression in one bar), and so on. When selecting the teaching mode, the user selects a music piece to be played, sets the split point (SP), selects right- or left-hand practice, sets the number of beats in the tapping performance, sets an allowable range of deviation from teacher's timing (X [tick] in FIG. 6B), and so on. When selecting the multi-part mode, the user selects a music piece to be played, sets the split point (SP), carries out division into the designated part and the remaining part, assigns each of the designated part and the remaining part to a desired key range, sets the number of beats in the tapping performance, and so on. The division into the designated part and the remaining part can arbitrarily be made by the user. For example, a concerto can be divided into a solo performance part or a melody part and other parts. The tapping performance can be set to both the key ranges divided by the split point SP, or the free performance can be set to only one of these key ranges. When the foot tapping mode or the upper/lower keyboard split mode is selected, required detailed settings can similarly be made by the user.

As explained above, the detailed settings for the teaching mode are carried out in the step S56, whereupon the process proceeds to the step S57 in which the teaching mode is set to be on.

When it is detected in the step S52 that any button is operated, or after the teaching mode is set to be off in the step S55 or to be on in the step S57, or after the processing for an operated button is performed in the step S58, whether or not key depression data is received is determined in the step S59. When key depression data is not received, the process returns to the step S52.

When a key depression is performed on the keyboard 34 and key depression data is received via the MIDI interface circuit 35, the process proceeds to step S60 where whether or not the teaching mode is set to be on is determined.

When the teaching mode is set to be on, the process proceeds to step S61 where processing for the teaching assistance function selected and set in the step S56 is carried out. For example, when any of the tapping duet mode, the multi-part mode, the foot tapping mode, and the upper/lower keyboard split mode is selected in the step S56, the processing in the step S23 and the subsequent steps shown in FIG. 4 is carried out. On the other hand, when the teaching mode is selected, the processing in the step S23 and the subsequent steps shown in FIG. 5 is carried out. It should be noted that in this embodiment, sounding instruction data and muting instruction data are output to the tone generator 40.

In this manner, the operation is performed in accordance with the selected teaching assistance function.

On the other hand, when the teaching mode is set to be off (when the free performance mode is selected), sounding instruction data corresponding to the received key depression data is output to the tone generator 40 (S62).

As a result, a musical tone corresponding to a key depressed by the performer is generated by the tone generator 40, and the musical tone is emitted from the speaker 41. In other words, the same operation as in an ordinary electronic keyboard musical instrument is performed. Then, the process returns to the step S52.

As described above, according to this embodiment, the teaching mode can be set to be on/off by operating the teaching mode button 37, and therefore, the user can easily utilize the desired teaching assistance function, as desired.

It should be noted that FIG. 7 shows the case that this embodiment is applied to the electronic keyboard musical instrument. However, this embodiment can similarly be applied to a system comprised of the main unit 1 and the terminal 2 having the tone generator incorporated therein as show in FIGS. 1 and 2.

In the above, the arrangement has been described where the split point SP is set at only one place to divide the keyboard 23 into two key ranges. However, the split point can be set at two or more places to divide the keyboard 23 into three or more key ranges. Furthermore, the tapping performance key range or the normal performance key range can arbitrarily be set for each key range.

In that case, music data including a plurality of parts is used, and these parts are arbitrarily assigned to the plurality of key ranges, whereby one or more tapping performance parts and one or more normal performance parts can arbitrarily be set to three or more key ranges.

Furthermore, tapping performance parts can be assigned to all the divided key ranges. In that case, these performance parts are assigned to respective ones of the key ranges, and the respective performance parts can be reproduced in tempo determined based on performance information generated upon key depression being made on the respective key ranges. Thus, even unskilled person can enjoy playing a duet.

In a case that there are a plurality of tapping performance key ranges, different performance forms (for example, musical tones of different types of musical instruments, different numbers of beats, or the like) can be assigned to these key ranges.

Moreover, assignment of performance modes (tapping performance or normal performance) to key ranges can be changed in a desired timing. In that case, performance parts can be exchanged during the performance, and key depression ranges can arbitrarily be changed.

Instead of setting the split point SP to divide the keyboard into key ranges each comprised of a continuous block of keys as described above, a table for defining key ranges can be provided for each keyboard, whereby keys used for the tapping performance and keys used for the normal performance can arbitrarily be defined. In that case, only several black keys on the left side on the keyboard 23 or 34, for example, can be defined to be in the tapping performance key range, whereby the black keys which are easy to press can be made to be in the tapping performance key range.

In the above, a performance input from the divided ranges of the keyboard 23 or 34 is used as a tapping performance input, but this is not limitative.

For example, in a case where a performance terminal such as an electronic percussion or wind instrument, which is capable of outputting a MIDI message, is connected via a MIDI interface box to the MIDI interface circuit 17 together with the performance terminal 2 which is the electronic keyboard musical instrument, performance information supplied from the performance terminal such as the electronic percussion or wind instrument can be used for the tapping performance, whereas performance information (key depression data) supplied from the performance terminal 2 can be used for the normal performance.

In that case, an accompanist can play a selected part simply by hitting a percussion surface of the electronic percussion instrument at a constant rhythm or by tooting the electronic wind instrument at a constant rhythm.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium.

In that case, the program code itself read from the storage medium realizes the functions of the above described embodiments, and therefore, the program code and the storage medium in which the program code is stored constitute the present invention.

Examples of the storage medium for supplying the program code include a floppy (registered trademark) disk, a hard disk, and a magnetic-optical disk, an optical disk such as a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A musical performance processing apparatus comprising:
    a storage unit adapted to store music data including a plurality of performance parts;
    a performance control unit adapted, when input with performance information, to generate a musical tone corresponding to the performance information input thereto;
    a performance reproduction control unit adapted, when input with performance information, to reproduce a performance part designated from among the plurality of performance parts in tempo determined based on the performance information input thereto;
    an assigning unit adapted to assign the performance part designated from among the plurality of performance parts to at least one performance terminal; and
    a performance information processing unit adapted, when input with performance information which is output from the at least one performance terminal in response to a performer's operation thereon, to output the input performance information to said performance control unit or said performance reproduction control unit in accordance with a type of the input performance information.

2. The musical performance processing apparatus according to claim 1, wherein said performance terminal includes an electronic keyboard musical instrument having a plurality of key ranges each comprised of a plurality of keys, said assigning unit is adapted to assign the performance part designated from among the plurality of performance parts to a key range designated from among the plurality of key ranges, and said performance information processing unit is adapted to output the performance information associated with a part of the key range in the electronic keyboard musical instrument to said performance control unit, and output the performance information associated with another part of the key range to said performance reproduction control unit.

3. The musical performance processing apparatus according to claim 1, wherein when a difference greater than a predetermined value is present between the input performance information and performance data included in the music data in association with the designated performance part, said performance control unit is adapted not to generate a musical tone corresponding to the input performance information.

4. The musical performance processing apparatus according to claim 1, including:

a setting unit adapted to set a teaching mode to be on or off, wherein said performance information processing unit is adapted to output the performance information, which is output in response to the performer's operation, to said performance control unit irrespective of the type of the performance information when the teaching mode is off.

5. A storage medium computer-readably storing a program for causing a computer to execute a musical performance processing method in a musical performance processing apparatus having a storage unit in which music data including a plurality of performance parts is stored, the musical performance processing method comprising:

a performance control step of, when input with performance information, generating a musical tone corresponding to the input performance information;

a performance reproduction control step of, when input with performance information, reproducing a performance part designated from among the plurality of performance parts in tempo determined based on the input performance information;

an assigning step adapted to assign the performance part designated from among the plurality of performance parts to at least one performance terminal; and a performance information processing step of, when input with performance information which is output from the at least one performance terminal in response to a performer's operation thereon, outputting the input performance information to said performance control step or said performance reproduction control step in accordance with a type of the input performance information.

6. The storage medium according to claim 5, wherein when a difference greater than a predetermined value is present between the input performance information and performance data included in the music data in association with the designated performance part, a musical tone corresponding to the input performance information is not generated in said performance control step.

7. The storage medium to claim 5, wherein in said performance information processing step, the performance information output in response to the performer's operation is output to said performance control step irrespective of the type of the performance information when a teaching mode is set to be off by a setting unit of the musical performance processing apparatus for setting the teaching mode to be on or off.

* * * * *